(12) United States Patent
Acree et al.

(10) Patent No.: US 7,130,871 B2
(45) Date of Patent: Oct. 31, 2006

(54) METHOD AND APPARATUS FOR REPRESENTING DELETED DATA IN A SYNCHRONIZABLE DATABASE

(75) Inventors: Richard Kevin Acree, Austin, TX (US); Brian Lee White Eagle, Austin, TX (US); William Harold Gengler, Austin, TX (US); Roy Paterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 10/273,591

(22) Filed: Oct. 17, 2002

(65) Prior Publication Data

US 2004/0078393 A1 Apr. 22, 2004

(51) Int. Cl.
*G06F 17/30* (2006.01)
(52) U.S. Cl. ............ 707/203; 707/201; 707/202; 707/204; 707/205; 707/206
(58) Field of Classification Search ........ 707/101, 707/201, 204, 8, 10, 102, 103 R, 104.1, 203, 707/202, 205, 206; 717/171
See application file for complete search history.

(56) References Cited

U.S. PATENT DOCUMENTS

| | | | |
|---|---|---|---|
| 4,996,663 A | 2/1991 | Nemes | 364/900 |
| 5,761,658 A * | 6/1998 | Nishikawa et al. | 707/8 |
| 5,943,676 A | 8/1999 | Boothby | 707/201 |
| 6,330,568 B1 | 12/2001 | Boothby et al. | 707/201 |
| 6,535,892 B1 * | 3/2003 | LaRue et al. | 707/203 |
| 6,549,917 B1 * | 4/2003 | Pollard et al. | 707/201 |
| 6,694,337 B1 * | 2/2004 | King et al. | 707/201 |
| 6,711,578 B1 * | 3/2004 | McCaw et al. | 707/101 |
| 6,983,293 B1 * | 1/2006 | Wang | 707/201 |
| 2003/0097381 A1 * | 5/2003 | Detweiler et al. | 707/201 |
| 2003/0159136 A1 * | 8/2003 | Huang et al. | 717/171 |
| 2003/0182327 A1 * | 9/2003 | Ramanujam et al. | 707/204 |

OTHER PUBLICATIONS http://www.syncml.org/index_page.html, "SyncML", SyncML Initiative Ltd., Sep. 16, 2002, 1 page.
http://www.synclm.org/technology.html, "Technology", SynchML, Sep. 16, 2002, 2 pages.
IBM, "Application Development Guide", Version 8, Release 1, Ibm DB2 Everyplace, 1999, 2002.
SyncML White Paper, "Building an Industry-Wide Mobile Data Synchronization Protocol", Version 1.0, www.SyncML.org.

* cited by examiner

*Primary Examiner*—Thuy N. Pardo
(74) *Attorney, Agent, or Firm*—Duke W. Yee; Marilyn Smith Dawkins; Robert Rolnik

(57) ABSTRACT

A method, apparatus, and computer instructions for synchronizing a database used by a client device with at least one server. A locally unique identifier is associated with each record in the database at the client. The locally unique identifier for a deleted record is changed to a selected value. This value is selected in a manner to indicate that a record has been deleted. This locally unique identifier may be a negative value and may be selected by multiplying the locally unique identifier by a negative one. The selected value is used in synchronizing the database and is used to track records deleted since a last synchronization of the database. In the depicted examples, this selected value is unique and allows for mapping back to the locally unique identifier for the record.

20 Claims, 3 Drawing Sheets

METHOD AND APPARATUS FOR REPRESENTING DELETED DATA IN A SYNCHRONIZABLE DATABASE

BACKGROUND OF THE INVENTION

1. Technical Field

The present invention relates generally to an improved data processing system, and in particular, to a method and apparatus for synchronizing data. Still more particularly, the present invention provides a method and apparatus for representing deleted data in a synchronizable database.

2. Description of Related Art

Portable devices, such as personal digital assistants (PDAs) and laptop computers, have become more and more pervasive in everyday use. As microprocessors have become more powerful and storage has become smaller in physical size, PDAs have become more and more popular. A PDA is a handheld computer that serves as an organizer for personal information. A PDA generally includes at least a name and address database, to-do list and note taker. PDAs are pen based and use a stylus to enter selections on menus and to enter printed characters. A PDA also may include a small on-screen keyboard, which is tapped with the pen.

Data may be synchronized between the PDA and desktop computer through a communications link, such as a cable or a wireless link. The databases on these types of devices are also referred to as embedded databases. An embedded database is a database program used on an embedded device, such as a PDA, a cell phone, or some other similar dedicated device. This type of database may be developed from scratch or may be a slimmed down version of a database management system. These embedded devices have limited amounts of memory. The databases are typically synchronized with other devices, such as a desktop data processing system or a server. In synchronizing a database, the synchronization process requires keeping track of deleted records on the database located on the embedded device between synchronizations.

Currently, one approach involves maintaining a log of all deleted record log identifiers along with the change identifier associated with the deletion. One disadvantage of this approach is that a log is required to be created and maintained. This log takes up additional valuable memory space in the device. Further, these logs are typically of fixed size and suffer from overflow and wraparound problems. Deletions also take two actions, the actual deletion of a record from the database and the creation of an entry in the log. These logs also do not allow for an undelete capability in addition to consuming additional memory.

Another approach currently used involves adding a "deleted flag" field to each record in the database to track deleted records. One disadvantage of this approach is that an additional field must be maintained by the database engine, requiring additional memory. Different database engines use different amounts of space for fields within the database. As a result, the amount of space consumed may vary.

Therefore, it would be advantageous to have an improved method, apparatus, and computer instructions for tracking deleted records for use in synchronizing a database while minimizing the amount of memory consumed.

SUMMARY OF THE INVENTION

The present invention provides a method, apparatus, and computer instructions for synchronizing a database used by a client device with at least one server. A locally unique identifier is associated with each record in the database at the client. The locally unique identifier for a deleted record is changed to a selected value. This value is selected in a manner to indicate that a record has been deleted. This locally unique identifier may be a negative value and may be selected by multiplying the locally unique identifier by a negative one. The selected value is used in synchronizing the database and is used to track records deleted since a last synchronization of the database. In the depicted examples, this selected value is unique and allows for mapping back to the locally unique identifier for the record.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
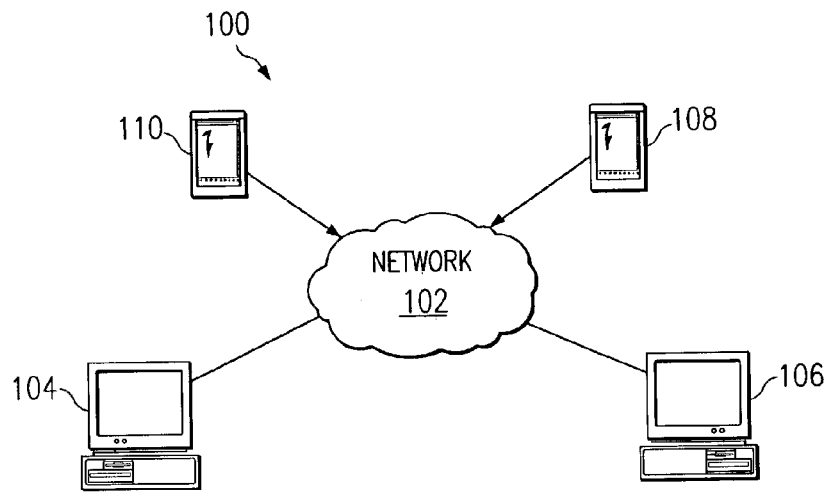
FIG. 1 is a diagram illustrating a network data processing system in accordance with a preferred embodiment of the present invention.

With reference now to the figures, and in particular to FIG. 1, a diagram illustrating a network data processing system is depicted in accordance with a preferred embodiment of the present invention. Network data processing system 100 is a network of computers in which the present invention may be implemented. Network data processing system 100 contains network 102, which is the medium used to provide communications links between various devices and computers connected together within network data processing system 100. Network 102 may include connections, such as wire, wireless communication links, or fiber optic cables.

Network 102 provides communications with server 104, server 106, PDA 108, and PDA 110. In these examples, PDA 108 and PDA 110 contain databases, which may be synchronized with databases on servers 104 and 106. The synchronization process may occur through a connection to network 102, which may take various forms. For example, network 102 may be as simple as a set of wires directly connecting the PDAs to the servers or a wireless connection. Network 102 may take a more complex form, such as a local or wide area network to which PDA 108 and PDA 110 establish a connection to synchronize their databases with databases located on servers 104 or 106. The databases on PDAs 108 and 110 may synchronize with a single database or multiple databases depending on the particular implementation. These databases may be located on a single server or multiple servers.

The present invention provides an improved method, apparatus, and computer instructions for synchronizing a database on an embedded device, such as PDA 108, with a database, such as one located on server 104. The mechanism of the present invention uses a local unique identifier (LUID), which is currently used in databases. A LUID is a non-zero number that uniquely identifies a given database record. In these examples, the LUID may be a time stamp of when a record was created. The mechanism of the present invention uses a selected value for the LUID to indicate that the record has been deleted. In this manner, no additional fields or change logs are required.

Figure 2:
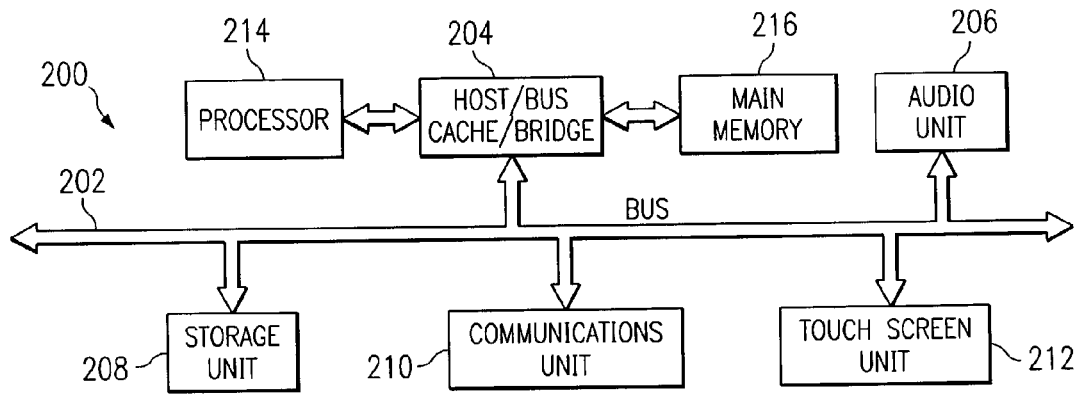
FIG. 2 is a block diagram of a data processing system in which the present invention may be implemented.

With reference now to FIG. 2, a block diagram of a data processing system is shown in which the present invention may be implemented. PDA 200 is an example of an embedded device, such as PDA 108 in FIG. 1, in which code or instructions implementing the processes of the present invention may be located.

PDA 200 includes a bus system, which provides an interconnect for host/bus cache bridge 204, audio unit 206, storage unit 208, communications unit 210, and touch screen unit 212. Host/bus cache bridge 204 provides a connection for processor 214 and main memory 216.

The processes of the present invention are performed by processor 202 using computer implemented instructions, which may be located in a memory, such as, for example, main memory 216 or storage unit 208. Audio unit 206 provides a mechanism for an audio output, such as presentation of an audio file. Audio unit 206 may be, for example, a speaker and/or an output for a headphone. Storage unit 208 may take various forms, such as, for example, a compact flash or a memory stick. In some cases, storage unit 208 may even take the form of a hard disk drive. Communications unit 210 provides for establishing a communications link with another device, such as, for example, a PDA or a server. Touch screen unit 212 provides a display to present information to a user as well as a mechanism to receive input. In this example, the input is received through the use of a stylus that is tapped on the display mechanism of touch screen unit 212.

A database system is located on PDA 200 and synchronized with one or more servers. When incrementally synchronizing two databases, each database must be able to determine all deltas or changes, such as a record insert, a modification, or a deletion, since the last successful synchronization. To perform this determination, each database maintains an anchor for every other database with which it has synchronized. Since change IDs are monotonically increasing, these change IDs may be used for the anchor. Records with change IDs greater than the last anchor can be used to compute the delta. This system works fine for additions and modifications. This system, however, does not work for deletions because the change ID is deleted along with the record making it unavailable to be used in computing the delta. To build a complete delta list, a way of maintaining information about a deleted record after it has been deleted is needed. In these examples, the mechanism of the present invention identifies deleted records by using negative LUIDs. Rather than issuing a record delete, the LUID is replaced by itself multiplied by a negative one. When retrieving records from the database, only records with positive LUIDs would be returned.

Figure 3:
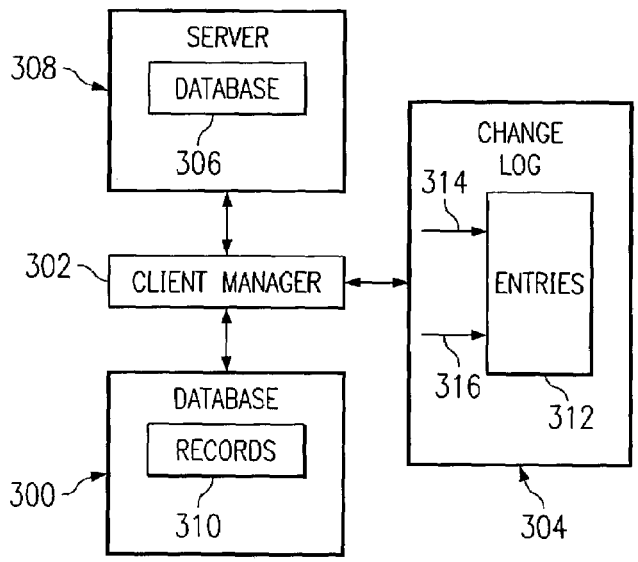
FIG. 3 is a diagram illustrating the representation of deleted data in a database in accordance with a preferred embodiment of the present invention.

Turning now to FIG. 3, a diagram illustrating the representation of deleted data in a database is depicted in accordance with a preferred embodiment of the present invention.

In this example, database 300 is an example of a database, which may be located on a client device, such as PDA 200 in FIG. 2. The mechanism of the present invention also includes a database manager 302, also located on the client device. These components are used in a synchronizing process to synchronize database 300 with database 306, which is located on server 308. Change log 304 is an optional component, which may be used when synchronizing database 300 with multiple servers.

Figure 4:
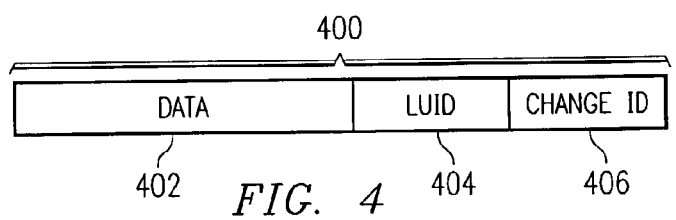
FIG. 4 is a diagram illustrating a database record in accordance with a preferred embodiment of the present invention.

Records 310 within database 300 includes locally unique identifiers (LUIDs), which are used to track deleted records within records 310 between synchronizations of database 300. A LUID is changed to a selected value when a record is deleted. When synchronizing database 300 with database 306, database manager 302 examines the LUIDs for each database to find deleted records, which should be identified in the synchronization process with database 306. In these examples, a LUID for a record is multiplied by a negative one to indicate that the record has been deleted. Through this mechanism, no additional memory is required to identify deleted records. With reference now to FIG. 4, a diagram illustrating a database record is depicted in accordance with a preferred embodiment of the present invention. Record 400 is an example of a record in a database, such as within database 300 in FIG. 3. Record 400 includes data 402, LUID 404, and change ID 406. LUID 404 is a non-zero number, which uniquely identifies record 400. Change ID 406 is a monotonically increasing number for a given database. Typically, change ID 406 may be a number or a time stamp. In this example, LUID 404 also may take the form of a number representing a time stamp.

If record 400 is deleted, LUID 404 is changed to a negative value to indicate that the record has been deleted. When LUID 404 is changed to a negative value, change ID 406 also is updated in these examples. Record 400 may be undeleted in accordance with a preferred embodiment of the present invention by multiplying LUID 404 by a negative one, returning LUID 404 to a positive value. In undeleting record 400, change ID 406 also is updated. This mechanism allows for data to be deleted and undeleted without a loss of data and without requiring another data structure to track the deleted records.

Turning back to FIG. 3, change log 304 may be used in cases in which database 300 is synchronized with multiple servers. In this case, anchors for different databases synchronized with database 300 may be maintained within change log 304. In this example, entries 312 are maintained in change log 304. Anchor 314 represents a last synchronization with one database, while anchor 316 represents a last synchronization with another database. Based on these anchors, deleted records, those with negative LUIDs, that have a change ID less than or equal to all existing anchors, anchor 314 and anchor 316, may be removed from database 300. The use of change log 304 is optional and only used in these examples in the instance in which database 300 is synchronized with more than one database. This mechanism prevents a database from continually growing. Also, deleted records do not need to be maintained before the first database synchronization.

Figure 5:
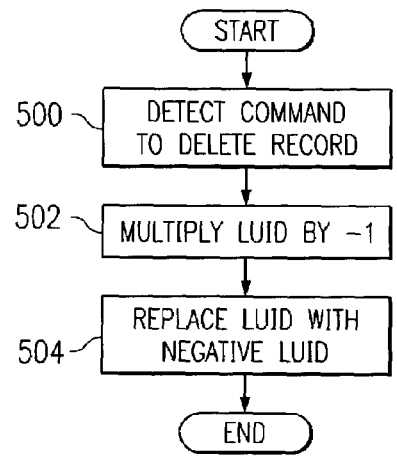
FIG. 5 is a flowchart of a process used for deleting a record in a database in accordance with a preferred embodiment of the present invention.

Turning now to FIG. 5, a flowchart of a process used for deleting a record in a database is depicted in accordance with a preferred embodiment of the present invention. The process illustrated in FIG. 5 may be implemented in a database manager, such as database manager 302 in FIG. 3.

The process begins by detecting a command to delete a record (step 500). The LUID is multiplied by negative one (step 502). The LUID is replaced with the negative LUID (step 504) with the process terminating thereafter. A similar process may be performed to undelete a deleted record. A record becomes undeleted when the LUID is returned to a positive state.

Figure 6:
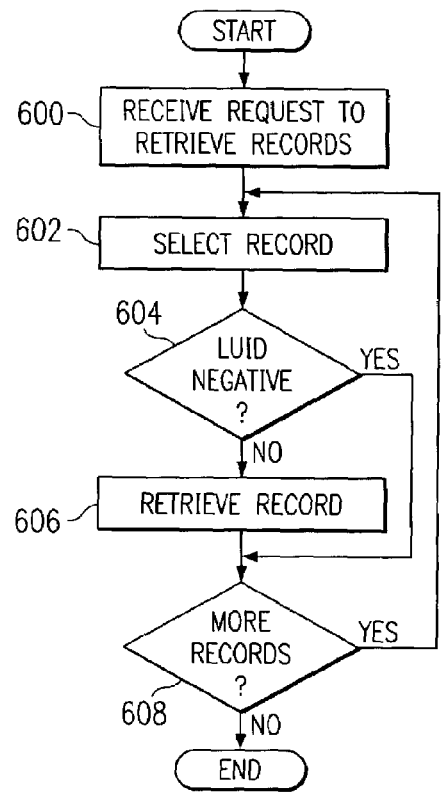
FIG. 6 is a flowchart of a process used for retrieving records from a database in accordance with a preferred embodiment of the present invention.

With reference now to FIG. 6, a flowchart of a process used for retrieving records from a database is depicted in accordance with a preferred embodiment of the present invention. The process illustrated in FIG. 6 may be implemented in a database manager, such as database manager 302 in FIG. 3. This process may be used to retrieve one or more records from a database and only retrieves undeleted records in these examples.

The process begins by receiving a request to retrieve records from a database (step 600). In these examples, the request is a query for records in the database. A record is selected based on the request (step 602). A determination is made as to whether the selected record has a negative LUID (step 604). If the record does not have a negative LUID, the record is retrieved (step 606). Thereafter, a determination is made as to whether more records are present (step 608). If more records are absent, the process terminates. Otherwise, the process returns to step 602 as described above. With reference again to step 604, if the LUID associated with a record is negative, the process also proceeds to step 608 as described above.

Figure 7:
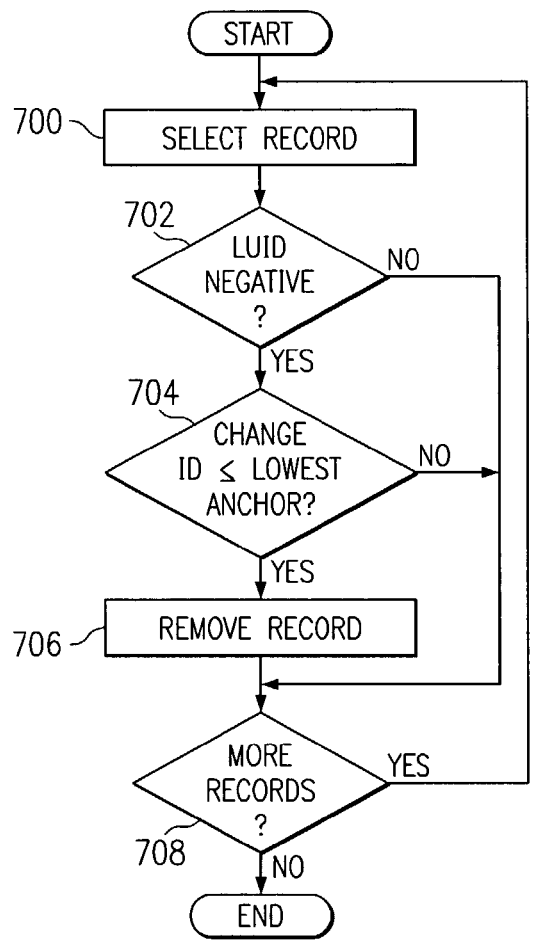
FIG. 7 is a flowchart of a process used for removing records from a database in accordance with a preferred embodiment of the present invention.

Turning now to FIG. 7, a flowchart of a process used for removing records from a database is depicted in accordance with a preferred embodiment of the present invention. The process illustrated in FIG. 7 may be implemented database manager, such as database manager 302 in FIG. 3. This process actually removes deleted records from the database and may be performed periodically or after a synchronization process. In other words, this process describes a clean-up phase in handling a database.

The process begins by selecting a record (step 700). A determination is made as to whether the LUID is negative (step 702). If the LUID is negative, a determination is made as to whether the change ID associated with this record is less than or equal to an anchor for the database (step 704). This comparison is basically a comparison of time stamps with one time stamp being that of the change ID and the other time stamp being that of the lowest anchor. As mentioned above, the anchor represents the last time the database was synchronized with another database. If the change ID associated with this record is less than or equal to an anchor for the database, the record is removed from the database (step 706).

Thereafter, a determination is made as to whether more records are present (step 708). If more records are absent, the process terminates. Otherwise, the process returns to step 700 as described above. Turning back to step 704, if the change ID is not less than or equal to the anchor, the process also proceeds to step 708. The process in step 702 proceeds to step 708 if the LUID is not negative. This process prevents the database from continually growing. With respect to records deleted prior to the first database synchronization, no need exists to maintain deleted record information because the local database is the master database at this time.

Figure 8:
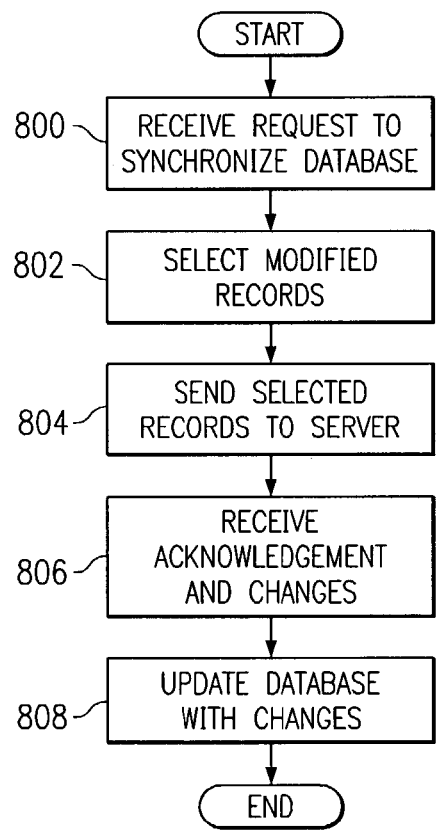
FIG. 8 is a flowchart of a process used for synchronizing records in a database with a server in accordance with a preferred embodiment of the present invention.

Turning now to FIG. 8, a flowchart of a process used for synchronizing records in a database with a server is depicted in accordance with a preferred embodiment of the present invention. The process illustrated in FIG. 8 may be implemented database manager, such as database manager 302 in FIG. 3.

The process begins by receiving a request to synchronize the database (step 800). In response to receiving this request, records with modifications are selected (step 802). These records are all records with a change identifier greater than the anchor associated with the server. Those records are then sent to the server (step 804). In response, an acknowledgment and possibly changes may be received from the server (step 806). Any changes received from the server are used to update the database (step 808) with the process terminating thereafter.

Thus, the present invention provides an improved method, apparatus, and computer instructions for representing deleted data in a synchronizable database. The mechanism of the present invention does not require additional data structures or fields in an existing database to represent and track deleted records within the database. The mechanism of the present invention provides this advantage through the use of a selected value for the LUID. In these examples, the LUID is changed to a negative state by multiplying the LUID by a negative one to indicate that the record has been deleted. Any algorithm or process that guarantees a unique LUID and that is bi-directional may be used. By being bi-directional, an ability to undelete data is provided. Bi-directionality is also used to map back to the original LUID on the server, such that the server knows which data or records to delete.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for synchronizing a database used by a client device with at least one server, the method comprising:
  associating locally unique identifier with each record in the database; and
  changing a locally unique identifier for a deleted record to a negative value selected to indicate that a record has been deleted, wherein the negative value is used to track records deleted since a last synchronization of the database.

2. The method of claim 1, wherein the negative value is generated by multiplying the locally unique identifier by a negative one.

3. The method of claim 2 further comprising:
retrieving only records with positive locally unique identifier from the database.

4. The method of claim 2 further comprising:
removing a record having a negative locally unique identifier if a change identifier is less than or equal to all existing anchors.

5. The method of claim 1, wherein the client device is one of a personal digital assistant, a server, personal computer, and a mobile phone.

6. The method of claim 1, wherein the database is synchronized with a second database located on a data processing system.

7. The method of claim 2 further comprising:
returning the negative value to a positive value to undelete the deleted record.

8. A data processing system for synchronizing a database used by a client device with at least one server, the data processing system comprising:
a bus system;
a communications unit connected to the bus system;
a memory connected to the bus system, wherein the memory includes a set of instructions; and
a processing unit connected to the bus system, wherein the processing unit executes the set of instructions to associate a locally unique identifier with each record in the database; and change a locally unique identifier for a deleted record to a negative value selected to indicate that a record has been deleted in which the negative value is used to track records deleted since a last synchronization of the database.

9. A data processing system for synchronizing a database used by a client device with at least one server, the data processing system comprising:
associating means for associating a locally unique identifier with each record in the database; and
changing means for changing a locally unique identifier for a deleted record to a negative value selected to indicate that a record has been deleted, wherein the negative value is used to track records deleted since a last synchronization of the database.

10. The data processing system of claim 9, wherein the negative value is generated by multiplying the locally unique identifier by a negative one.

11. The data processing system of claim 10 further comprising:
retrieving means for retrieving only records with a positive locally unique identifier from the database.

12. The data processing system of claim 10 further comprising:
removing means for removing a record having a negative locally unique identifier if a change identifier is less than or equal to all existing anchors.

13. The data processing system of claim 9, wherein the client device is one of a personal digital assistant a server, personal computer, and a mobile phone.

14. The data processing system of claim 9, wherein the database is synchronized with a second database located on a data processing system.

15. The data processing system of claim 10 further comprising:
returning means for returning the negative value to a positive value to undelete the deleted record.

16. A method for synchronizing a database used by a client device with at least one server, the method comprising:
associating a locally unique identifier with each record in the database, wherein the locally unique identifier uniquely Identifies the record in the database that it is associated with, and wherein a given locally unique identifier is used to access a given record that it is associated with during normal database access; and
changing the given locally unique identifier for the given record to a selected value selected to indicate that a record has been deleted, wherein the selected value is used in synchronizing the database with the at least one server.

17. A computer program product in a computer readable medium for synchronizing a database used by a client device with at least one server, the computer program product comprising:
first instructions for associating a locally unique identifier with each record in the database; and
second instructions for changing a locally unique identifier for a deleted record to a negative value selected to indicate that a record has been deleted, wherein the negative value is used to track records deleted since a last synchronization of the database.

18. A method for synchronizing a database used by a client device with at least one server, the method comprising:
associating a locally unique identifier with each record in the database; and
changing a locally unique identifier for a deleted record to a negative value selected to indicate that a record has been deleted, wherein the negative value is used to track records deleted since a last synchronization of the database and wherein the negative value is generated by multiplying the locally unique identifier by a negative one; and
removing a record having a negative locally unique identifier if a change identifier is less than or equal to all existing anchors.

19. The method of claim 18 further comprising:
retrieving only records with a positive locally unique identifier from the database.

20. The method of claim 18, wherein the database is synchronized with a second database located on a data processing system.

* * * * *